United States Patent Office 2,886,419
Patented May 12, 1959

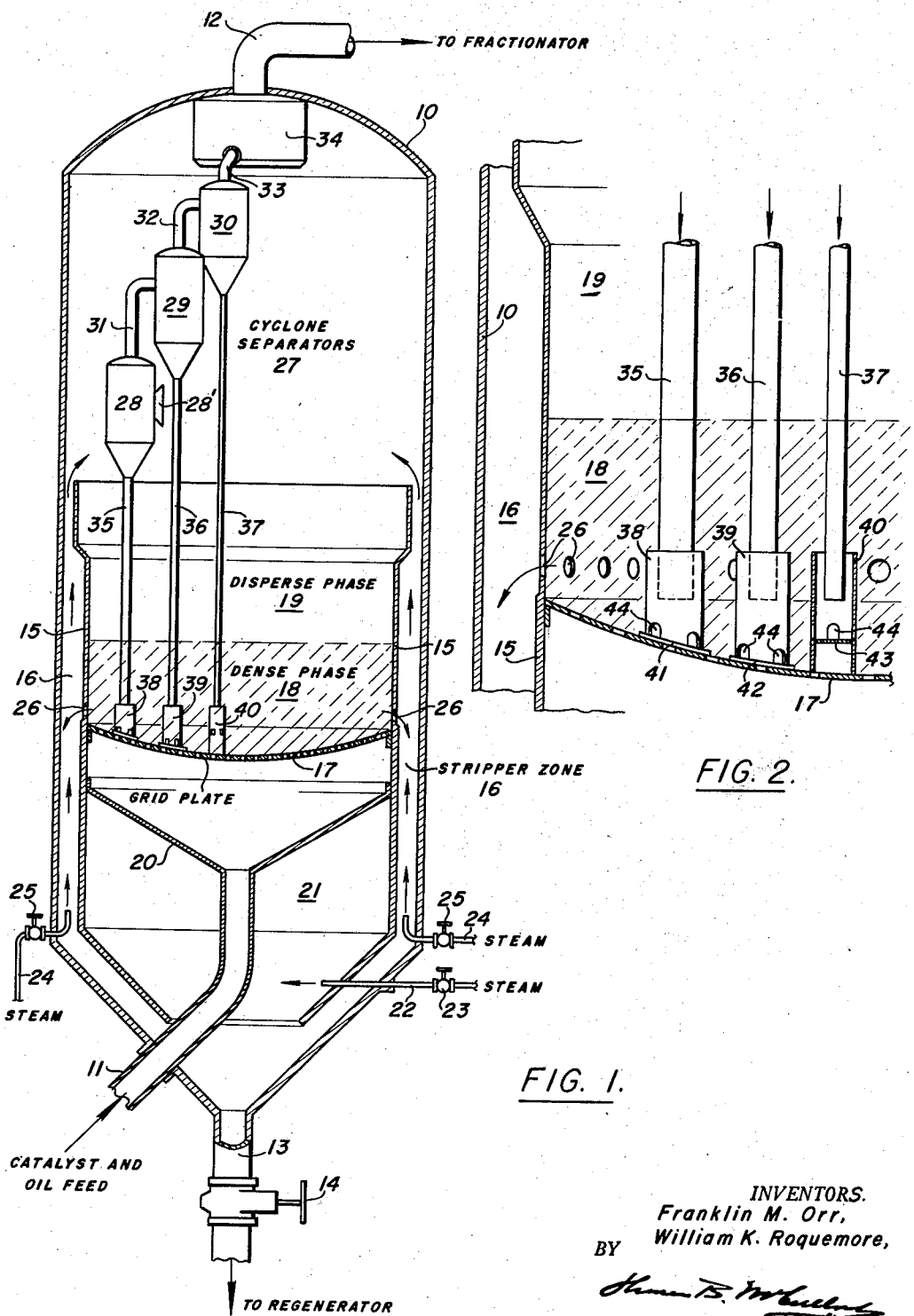

2,886,419

MEANS FOR MAINTAINING A DIP LEG SEAL IN A FLUIDIZED CATALYTIC REACTION VESSEL

Franklin M. Orr and William K. Roquemore, Baytown, Tex., assignors, by mesne assignments, to Esso Research and Engineering Company, Elizabeth, N.J., a corporation of Delaware Application March 10, 1955, Serial No. 493,390

4 Claims. (Cl. 23—288)

The present invention is directed to a catalytic reaction vessel. More particularly, the invention is directed to a combination of a catalytic reaction vessel used in catalytic cracking operations and separation means arranged therein. In its more particular aspects, the invention is directed to an improved catalytic reaction vessel provided with means for maintaining a seal in said vessel.

The present invention may be briefly described as a catalytic reaction vessel having at least one inlet at its lower end for introduction of catalyst and oil thereto and at least one outlet at its upper end for removal of products therefrom. The reaction vessel is provided with at least one cyclone separator arranged at the upper end of the vessel having a dip leg which is adapted to return finely divided catalyst separated from a disperse phase in the upper portion of the vessel to a dense phase in said vessel below said disperse phase. The dip leg of the cyclone separator has a cylindrical sleeve open on its upper end surrounding the lower end of the dip leg providing a quiescent zone on the lower end of the dip leg and sealing the dip leg. The sleeve has at least one opening adjacent its lower end for flow of gasiform material and fluid through the opening, with the sleeve being closed on its lower end by a splash plate whereby finely divided catalyst returned to the dense phase by the dip leg impinges against the splash plate before returning to the dense phase.

The sleeve arranged on the lower end of the dip leg may suitably have a diameter in the range between about 1.5 and 2.5 times the diameter of the dip leg. A preferred diameter of the sleeve is about 2 times the diameter of the dip leg.

For effective operation of our invention, the dip leg may extend a suitable distance below the open upper end of the sleeve in the range between about 0.5 and 5.0 times the diameters of the dip leg with the preferred distance of the dip leg extending below the upper end of the sleeve being in the range between about 1 and about 3 times the diameter of the dip leg.

The splash plate which closes the lower end of the sleeve should be arranged a distance from the lower open end of the dip leg between about 0.5 and about 4 times the diameter of the dip leg with a preferred distance being in the range between about 1 and about 2 times the diameter of the dip leg.

Arranged adjacent the lower end of the sleeve are a plurality of openings which suitably may comprise between about 50% and about 90% of the annular area between the dip leg and the sleeve. It is preferred that the opening or openings in the sleeve comprise between about 60% and about 80% of the annular area between the sleeve and the dip leg. While only one opening may be employed, a plurality of openings arranged on the periphery of the sleeve may be used. The opening may suitably be a slot which may extend around the periphery of the sleeve or, as stated before, may be a plurality of openings having any shape as may be desired. A plurality of arcuate openings have been found to be satisfactory.

The present invention will be further illustrated by reference to the drawing in which:

Fig. 1 is a front elevational view in section showing the apparatus of the present invention; and Fig. 2 is a partial sectional view in detail of the apparatus of Fig. 1.

Referring now to the drawing in which identical numerals will be employed to designate identical parts, numeral 10 designates a catalytic cracking reaction vessel of the fluidized type wherein finely divided catalyst is suspended in the vaporized hydrocarbon feed to be reacted. The reaction vessel 10 is provided with a first inlet 11 by way of which catalyst suspended in the vaporized hydrocarbon feed is introduced and numeral 12 designates an outlet by way of which cracked products are routed to a fractionating system, not shown. The outlet 12 is arranged in the upper end of the vessel. A second outlet 13 controlled by a valve 14 is provided for withdrawing spent catalyst from the lower end of vessel 10.

The vessel 10 has a cylindrical member 15 arranged therein which defines an annular stripper 16. A grid plate 17 is arranged adjacent the lower end of the cylindrical member 15 above which a dense phase 18, indicated by the shaded portion, is maintained. Above the dense phase 18 is a disperse phase 19.

By way of explanation, the dense phase 18 contains the major amount of catalyst in the reaction vessel 10 and the cracking reaction takes place therein whereas the disperse phase 19 contains a minor amount of catalyst. The dense phase may contain a sufficient amount of catlyst to provide a density of about 30 pounds of catalyst per cubic feet, whereas the disperse phase may contain only a sufficient amount of catalyst to provide a density of about 0.3 pound per cubic foot.

The inlet line 11 connects to a funnel-shaped member 20 which, in turn, is connected to the cylindrical member 15 for introduction of catalyst and feed hydrocarbon into the dense phase 18. Below the funnel-shaped member 20 is a relative quiescent space 21 which is maintained substantially free of catalyst by introduction of steam thereto by way of line 22 controlled by valve 23.

Provision is made for introduction of stripping medium which may be inert gas but is preferably steam through a plurality of lines 24 controlled by valves 25 for removal of volatile material from the catalyst which is introduced into the stripper 16 from the dense phase 18 by way of ports 26 which extend around the periphery of the lower end of the cylindrical member 15.

Arranged in the upper end of the vessel 10 are a plurality of cyclone separators generally designated by the numeral 27 and comprising serially interconnected cyclone separators 28, 29, and 30, separator 28 being the primary stage, separator 29 being the secondary stage, and separator 30 being the tertiary stage; separator 28 is connected to separator 29 by conduit 31 and separator 29 is connected to separator 30 by conduit 32, and separator 30 is connected by conduit 33 to a connection head 34 which connects to outlet line 12. Each of the separators 28, 29, and 30 may be a plurality of separators and may be arranged in banks of five as may be desired.

Each separator 28, 29, and 30 is provided with dip legs 35, 36, and 37 for return of finely divided catalyst to the dense phase 18, the catalyst being introduced from the disperse phase 19 into the primary stage separator 28 through an inlet 28'.

The lower end of each of the dip legs 35, 36, and 37 are surrounded by a cylindrical sleeve 38, 39, and 40 which are open on their upper ends and closed on their lower ends by splash plates 41, 42, and 43. Splash plates 41 and 42 rest on the grid 17 while the sleeve 40 forms its own support, splash plate 43 being arranged above the grid plate 17 as shown. Peripherally arranged adjacent the lower end of the sleeves 38, 39, and 40 are arcuate openings 44 which allow flow of fluid from the dip leg and sleeve into the dense phase 18, the area of the openings 44 being sufficient to provide a slight differential from the sleeve into the dense phase 18.

The dip legs 35, 36, and 37 are suitably sized to accommodate the amount of catalyst as it is discharged from the primary, secondary, and tertiary cyclone separators 28, 29, and 30, respectively. Thus the dip leg 35 may have an inside diameter of about 10 inches, the dip leg 36 may have an inside diameter of about 8 inches and the dip leg 37 may have an inside diameter of about 6 inches. The sleeves 38, 39, and 40 may vary in diameter but generally are about the same diameter such that as the size of the dip leg decreases the annular area between the sleeves and the dip leg increases.

It is understood, however, that, while we have given numerical values for the size of the dip leg, some variation is possible and the size may suitably be selected to accommodate the amount of catalyst to be returned to the dense phase.

The present invention has been particularly useful in fluid catalytic cracking of residual stocks, such as deasphalted oil obtained by solvent deasphalting of reduced crudes and residues from crude oil. In such operations, the residual oil is dissolved in a light hydrocarbon, such as propane, and temperature and pressure conditions are suitably adjusted to separate an oil phase from an asphalt phase, the oil phase after removal of solvent, such as propane, is a desirable catalytic cracking feed stock and may have a reduced metal content which allows it to be cracked effectively under suitable selected conditions without formation of large amounts of coke. In such operations, however, the catalyst holdup in the catalytic reaction vessel employing a fluidized catalyst which suitably may be silica-alumina in finely divided form, the refractory nature of said stock at cracking temperatures in the range between 800° and 1200° F. makes it important not to maintain a large catalyst holdup above the grid plate 17. It is necessary to maintain a seal for the dip leg while reducing the amount of catalyst holdup above the grid plate 17 and heretofore, prior to the present invention, difficulty was encountered in maintaining such a seal.

The present invention allows the maintenance of a seal at all times while reducing the catalyst holdup above the grid plate 17 to a minimum. For example, in a commercial catalytic cracking vessel, such as 10, which may handle as much as 55,000 barrels of hydrocarbon feed stock per day, 15 to 20 tons of catalyst in the reactor is a minimum desirable holdup with the major amount of the catalyst in the dense phase.

With the present invention it has been found that the catalyst holdup in the reaction vessel may be reduced until the upper level of the dense phase is adjacent the discharge openings 26 to the stripper 16. At this minimum holdup, approximately 12 inches of overlap may exist between the bed level and the bottom of the dip legs, such as 35, 36, and 37. If the bed level, which is generally indicated by numeral 18a, were smooth and level with no turbulence, the 12 inch overlap may be sufficient to seal the dip leg. However, fluidized beds are very turbulent and anything but level. Thus in accordance with the prior art teachings the dip legs 35, 36, and 37 would not be sealed at all times and it has been commercial practice heretofore, and prior to our invention, to allow a 3-foot overlap to provide submergence for the dip leg at minimum holdup of catalyst in the reaction vessel 10.

In accordance with our invention it has been possible to reduce the holdup so that only 12 inches overlap is required. This has been accomplished by providing a substantially quiescent zone on the lower end of each dip leg by surrounding the lower end of each dip leg with a sleeve which allows the catalyst to provide a seal around the lower end of the dip leg. Each sleeve is closed on its lower end to cause the catalyst to impinge against a splash plate and each sleeve has at least one opening adjacent its lower end for flow from the dip leg into the dense phase, the openings being suitably sized to provide a pressure differential from the interior of the sleeve to the dense phase.

In order to illustrate the benefits of the present invention further, comparisons were made over nine-month periods wherein operations were conducted at minimum catalyst holdup without the dip leg sealed in accordance with the present invention and after installation of the present apparatus and with the dip leg sealed. The results of these comparisons are presented in the following table:

Table

|  | Run 17 (Before) | Run 18 (After) |
|---|---|---|
| Catalyst Carryover to Fractionator, Tons/Day | 6.0 | 1.7 |
| Reactor Holdup Above Grid, Tons | 35 | 20 |
| Catalyst Bed Level, Feet above: | | |
| Stripper Inlet ports | 5.20 | 2.08 |
| Dip Leg Bottom | 5.20 | 3.08 |

It will be seen from the foregoing data that before employment of the present apparatus the carryover of catalyst to the fractionator was 6 tons per day which was reduced in accordance with our invention to 1.7 tons per day. The reactor holdup above the grid prior to the present invention was 35 tons per day which was then reduced to about 20 tons per day.

It is to be noted that the present invention is quite effective in that even with low levels above the dip leg bottom and above the stripper inlet port substantially little catalyst carryover is obtained which certainly is contrary to what might be expected.

It will be clear from the foregoing description and example that a substantially improved and unexpected result has been obtained with the mode of operation and apparatus of the present invention. It is possible to crack refractory stocks at low catalyst holdup without large losses of catalyst into the product. By maintaining a small amount of catalyst in a dense phase, carbon formation is also minimized. The refractory stocks are high carbon producers and also form large amounts of gases, both of which are undesirable. The present invention allows the amount of carbon laid down on the catalyst and the undesirable gases formed to be substantially reduced.

While we have given specific examples of the present invention, these are given by way of illustration and not by way of limitation.

The nature and objects of the present invention having been completely described and illustrated, what we wish to claim as new and useful and to secure by Letters Patent is:

1. In a catalytic cracking reaction vessel having at least one inlet at its lower end and at least one outlet at its upper end and provided with at least one cyclone separator having a dip leg adapted to return finely divided catalyst separated from a disperse phase in said vessel to a dense phase in said vessel, the combination with said vessel of a cylindrical sleeve surrounding the lower end of said dip leg having a diameter in the range between 1.5 and 2.5 times the diameter of the dip leg to provide a quiescent zone on the lower end of said dip leg to seal said dip leg, perforated means attached to said vessel and to the lower end of said sleeve supporting said sleeve free of said dip leg, said sleeve being provided with at least one opening adjacent its lower end for flow of gasiform material and fluid therethrough, said sleeve being closed on its lower end by a splash plate whereby finely divided catalyst returned to the dense phase by said dip leg impinges against said splash plate before returning to said dense phase, said dip leg extending below the upper end of the cylindrical sleeve a distance in the range between 0.5 and 5.0 times the diameter of the dip leg and said splash plate being arranged below the lower end of the dip leg a distance in the range between 0.5 and 4.0 times the diameter of the dip leg.

2. The combination with a reaction vessel in accordance with claim 1 in which the opening in the sleeve is of sufficient area to provide a pressure differential from the quiescent zone into the reaction vessel.

3. In a catalytic cracking reaction vessel having at least one inlet at its lower end and at least one outlet at its upper end and provided with at least one cyclone separator having a dip leg adapted to return finely divided catalyst separated from a disperse phase in said vessel to a dense phase in said vessel, said vessel being provided with a grid plate spaced below the lower end of the dip leg, the combination with said vessel of a cylindrical sleeve having an open upper end surrounding the lower end of said dip leg and having a diameter in the range between 1.5 and 2.5 times the diameter of the dip leg to provide a quiescent zone on the lower end of said dip leg to seal said dip leg, said sleeve being attached by its lower end to said grid plate and supported by said grid plate free of said dip leg, said sleeve being provided with at least one opening adjacent its lower end for flow of gasiform material and fluid therethrough, said sleeve being closed on its lower end by a splash plate whereby finely divided catalyst returned to the dense phase by said dip leg impinges against said splash plate before returning to said dense phase, said dip leg extending below the open upper end of the cylindrical sleeve a distance in the range between 0.5 and 5.0 times the diameter of the dip leg, said splash plate being arranged below the lower end of the dip leg a distance in the range between 0.5 and 4.0 times the diameter of the dip leg, and the opening in the sleeve adjacent the lower end thereof comprising between about 50% and about 90% of the annular area between the sleeve and the dip leg.

4. In a catalytic cracking reaction vessel having at least one inlet at its lower end and at least one outlet at its upper end and provided with a plurality of serially interconnected cyclone separators each having a dip leg adapted to return finely divided catalyst separated from a disperse phase in said vessel to a dense phase in said vessel, said vessel being provided with a grid plate spaced below the lower end of the dip leg, the combination with said vessel of a plurality of cylindrical sleeves, each sleeve surrounding the lower end of one of said dip legs to provide a quiescent zone on the lower end of said dip leg to seal said dip leg, each sleeve having a diameter in the range between 1.5 and 2.5 times the diameter of its dip leg, said sleeves being attached by their lower ends to said grid plate and being supported by said grid plate free of said dip legs, said sleeves being provided with at least one opening adjacent the lower ends of said sleeves for flow of gasiform material and fluid therethrough, said sleeves being closed on their lower ends by a splash plate whereby finely divided catalyst returned to the dense phase by each of said dip legs impinges against said splash plates before returning to said dense phase, each of said dip legs extending below the open upper end of its cylindrical sleeve a distance in the range between 0.5 and 5.0 times the diameter of its dip leg, each of said splash plates being arranged below the lower end of its dip leg a distance in the range between 0.5 and 4.0 times the diameter of its dip leg, said cyclone separators being interconnected in three stages with the major amount of catalyst being returned to the dense phase from the first stage cyclone separator and decreasing amounts from the second and third stage cyclone separators, the dip legs from said first, second, and third stage separators being of decreasing diameters whereby the annular area between the sleeves on the lower ends of said dip legs increases as the diameter of the dip legs decrease.

References Cited in the file of this patent
UNITED STATES PATENTS

| | | |
|---|---|---|
| 1,950,285 | Battle | Mar. 6, 1934 |
| 2,298,593 | Rubin et al. | Oct. 13, 1942 |
| 2,487,324 | Forsett | Nov. 8, 1949 |
| 2,528,586 | Ford | Nov. 7, 1950 |
| 2,559,876 | Hoekstra | July 10, 1951 |
| 2,590,980 | Kuhn | Apr. 1, 1952 |
| 2,663,561 | Muller | Dec. 22, 1953 |
| 2,784,803 | Saxton | Mar. 12, 1957 |